(12) United States Patent
Aktas

(10) Patent No.: US 12,252,043 B2
(45) Date of Patent: Mar. 18, 2025

(54) VEHICLE SEATING ASSEMBLY

(71) Applicant: Ford Global Technologies, LLC, Dearborn, MI (US)

(72) Inventor: Macit Aktas, Windsor (CA)

(73) Assignee: Ford Global Technologies, LLC, Dearborn, MI (US)

(*) Notice: Subject to any disclaimer, the term of this patent is extended or adjusted under 35 U.S.C. 154(b) by 265 days.

(21) Appl. No.: 18/119,377

(22) Filed: Mar. 9, 2023

(65) Prior Publication Data
US 2024/0300388 A1 Sep. 12, 2024

(51) Int. Cl.
| | |
|---|---|
| *B60N 2/10* | (2006.01) |
| *B60N 2/02* | (2006.01) |
| *B60N 2/20* | (2006.01) |

(52) U.S. Cl.
CPC ........... *B60N 2/10* (2013.01); *B60N 2/02246* (2023.08); *B60N 2/20* (2013.01)

(58) Field of Classification Search
None
See application file for complete search history.

(56) References Cited

U.S. PATENT DOCUMENTS

| | | | | |
|---|---|---|---|---|
| 4,247,071 A | * | 1/1981 | Carella ................ | B60N 2/1875 248/396 |
| 2024/0149752 A1 | * | 5/2024 | Kim ......................... | B60N 2/10 |
| 2024/0278693 A1 | * | 8/2024 | Hong ................. | B60N 2/02253 |
| 2024/0391361 A1 | * | 11/2024 | Lan .......................... | B60N 2/02 |

FOREIGN PATENT DOCUMENTS

| | | |
|---|---|---|
| CN | 216636262 U | 5/2022 |
| CN | 114851926 A | 8/2022 |

* cited by examiner

*Primary Examiner* — David E Allred
(74) *Attorney, Agent, or Firm* — Vichit Chea; Price Heneveld LLP

(57) ABSTRACT

A vehicle seating assembly includes a seat, a seatback, a track assembly, a front anchor, a rear anchor, and a first gear. The seatback is coupled to the seat. The seatback is pivotable relative to the seat. The track assembly is configured to couple the seat to a floor of a vehicle. The rear anchor is coupled to the seat and configured to engage with the track assembly. The front anchor is coupled to the seat and configured to engage with the track assembly. A position of the seat relative to the front anchor and the second anchor is adjustable. The first gear extends between the front anchor and the seat. The first gear defines a guide slot therein that receives a guide pin. Movement of the first gear adjusts a position of a front region of the seat relative to a rear region of the seat.

16 Claims, 8 Drawing Sheets

VEHICLE SEATING ASSEMBLY

FIELD OF THE DISCLOSURE

The present disclosure generally relates to seating assemblies. More specifically, the present disclosure relates to vehicle seating assemblies.

BACKGROUND OF THE DISCLOSURE

Consumers often compare available features and functionality between vehicles when making a purchasing decision. Accordingly, additional solutions are needed that provide features and functionality that are desirable to consumers.

SUMMARY OF THE DISCLOSURE

According to a first aspect of the present disclosure, a vehicle seating assembly includes a seat, a seatback, a track assembly, a front anchor, a rear anchor, and a first gear. The seatback is coupled to the seat. The seatback is pivotable relative to the seat. The track assembly is configured to couple the seat to a floor of a vehicle. The rear anchor is coupled to the seat and configured to engage with the track assembly. The front anchor is coupled to the seat and configured to engage with the track assembly. A position of the seat relative to the front anchor and the second anchor is adjustable. The first gear extends between the front anchor and the seat. The first gear defines a guide slot therein that receives a guide pin. Movement of the first gear adjusts a position of the front region of the seat relative to the rear region of the seat.

Embodiments of the first aspect of the disclosure can include any one or a combination of the following features:
  the vehicle seating assembly is movable between a design position, a lowered position, a raised position, and a reclined-and-raised position;
  the first gear does not contribute to transitioning the vehicle seating assembly between the design position, the lowered position, and the raised position;
  a position of the guide pin within the guide slot is only adjusted when the front region of the seat is adjusted relative to the rear region of the seat;
  the first gear includes a sector gear and a lift arm;
  a distal end of the lift arm includes a protrusion;
  the protrusion of the lift arm is received within an aperture defined by a portion of the seat;
  adjustment of the protrusion of the lift arm within the aperture defined by the portion of the seat adjusts the position of the front region of the seat relative to the rear region of the seat;
  adjustment of the protrusion of the lift arm within the aperture defined by the portion of the seat and adjustment of the first gear relative to the guide pin occurs in a synchronized manner;
  positioning the guide pin at a forward extreme of the guide slot and positioning the protrusion at a forward extreme of the aperture represent an upper limit of displacement that the first gear is capable of providing;
  the guide slot defined by the first gear is arcuate in shape; and
  adjustment of the first gear is accomplished by activation of a motor.

According to a second aspect of the present disclosure, a vehicle seating assembly includes a seat, a seatback, a track assembly, a rear anchor, a front anchor, and a first gear. The seat includes a front region and a rear region. The seatback is coupled to the seat. The seatback is pivotable relative to the seat. The track assembly is configured to couple the seat to a floor of a vehicle. The rear anchor is coupled to the seat and configured to engage with the track assembly. The front anchor is coupled to the seat and configured to engage with the track assembly. A position of the seat relative to the front anchor and the second anchor is adjustable. The first gear extends between the front anchor and the seat. The first gear defines a guide slot therein that receives a guide pin. The first gear includes a sector gear and a lift arm. A distal end of the lift arm includes a protrusion. The protrusion of the lift arm is received within an aperture defined by a portion of the seat. Adjustment of the protrusion of the lift arm within the aperture defined by the portion of the seat adjusts a position of the front region of the seat relative to the rear region of the seat.

Embodiments of the second aspect of the present disclosure can include any one or a combination of the following features:
  the vehicle seating assembly is movable between a design position, a lowered position, a raised position, and a reclined-and-raised position;
  the first gear does not contribute to transitioning the vehicle seating assembly between the design position, the lowered position, and the raised position;
  a position of the guide pin within the guide slot is only adjusted when the front region of the seat is adjusted relative to the rear region of the seat;
  the adjustment of the protrusion of the lift arm within the aperture defined by the portion of the seat and adjustment of the first gear relative to the guide pin occurs in a synchronized manner;
  positioning the guide pin at a forward extreme of the guide slot and positioning the protrusion at a forward extreme of the aperture represent an upper limit of displacement that the first gear is capable of providing;
  the guide slot defined by the first gear is arcuate in shape; and
  adjustment of the first gear is accomplished by activation of a motor.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
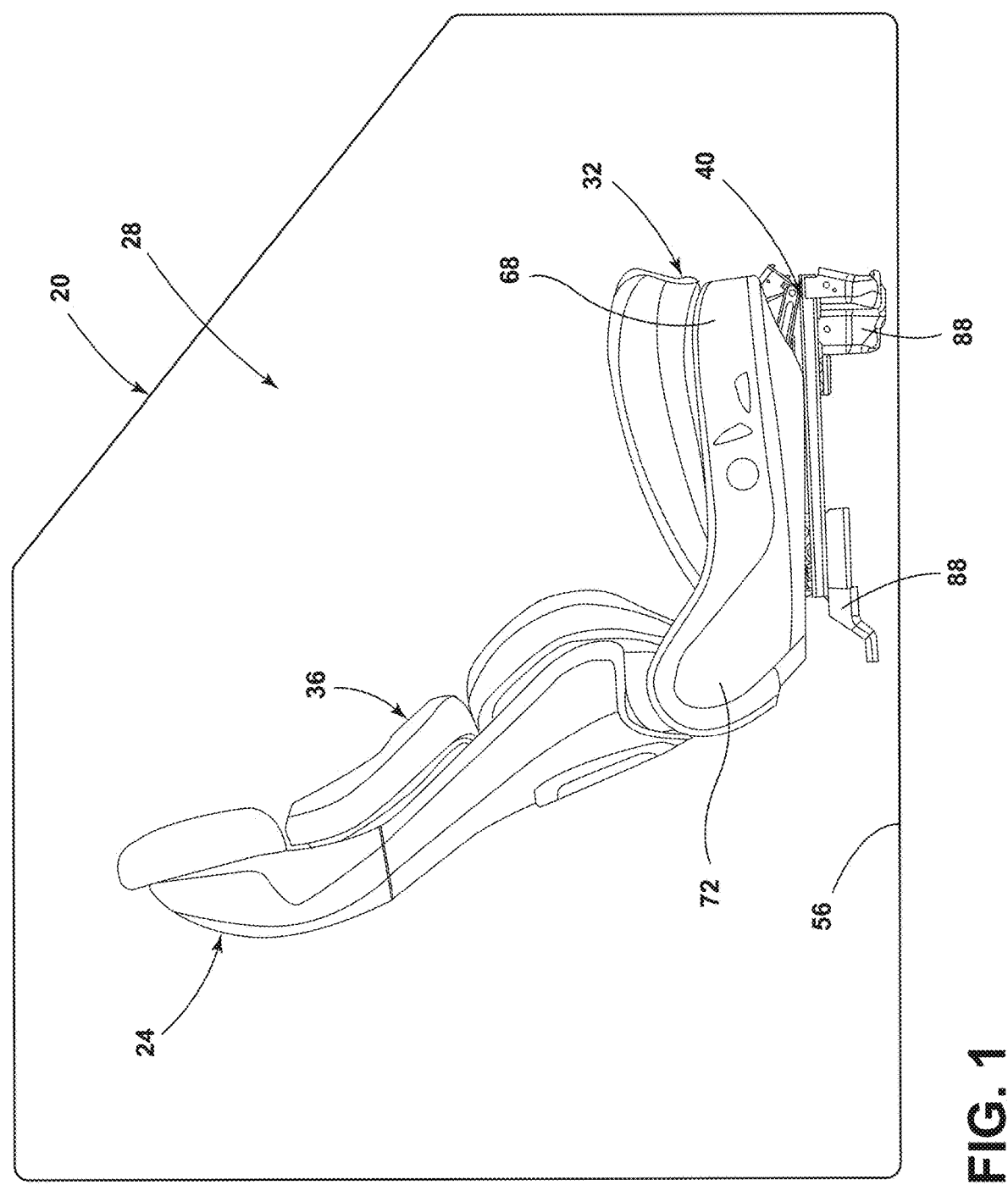
FIG. 1 is a side view of a vehicle seating assembly positioned within a passenger compartment of a vehicle, illustrating the vehicle seating assembly in a design position, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle seating assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-8, reference numeral 20 generally designates a vehicle. The vehicle 20 includes a vehicle seating assembly 24 positioned within a passenger compartment 28 thereof. The vehicle seating assembly 24 includes a seat 32, a seatback 36, a track assembly 40, a front anchor 44, a rear anchor 48, and a first gear 52. The seatback 36 is coupled to the seat 32. The seatback 36 is pivotable relative to the seat 32. The track assembly 40 is configured to couple the seat 32 to a floor 56 of the vehicle 20. The rear anchor 48 is coupled to the seat 32 and configured to engage with the track assembly 40. The front anchor 44 is coupled to the seat and configured to engage with the track assembly 40. A position of the seat 32 relative to the front anchor 44 and the rear anchor 48 is adjustable. The first gear 52 extends between the front anchor 44 and the seat 32. The first gear 52 defines a guide slot 60 therein that receives a guide pin 64. Movement of the first gear 52 adjusts a position of a front region 68 of the seat 32 relative to a rear region 72 of the seat 32.

Figure 7:
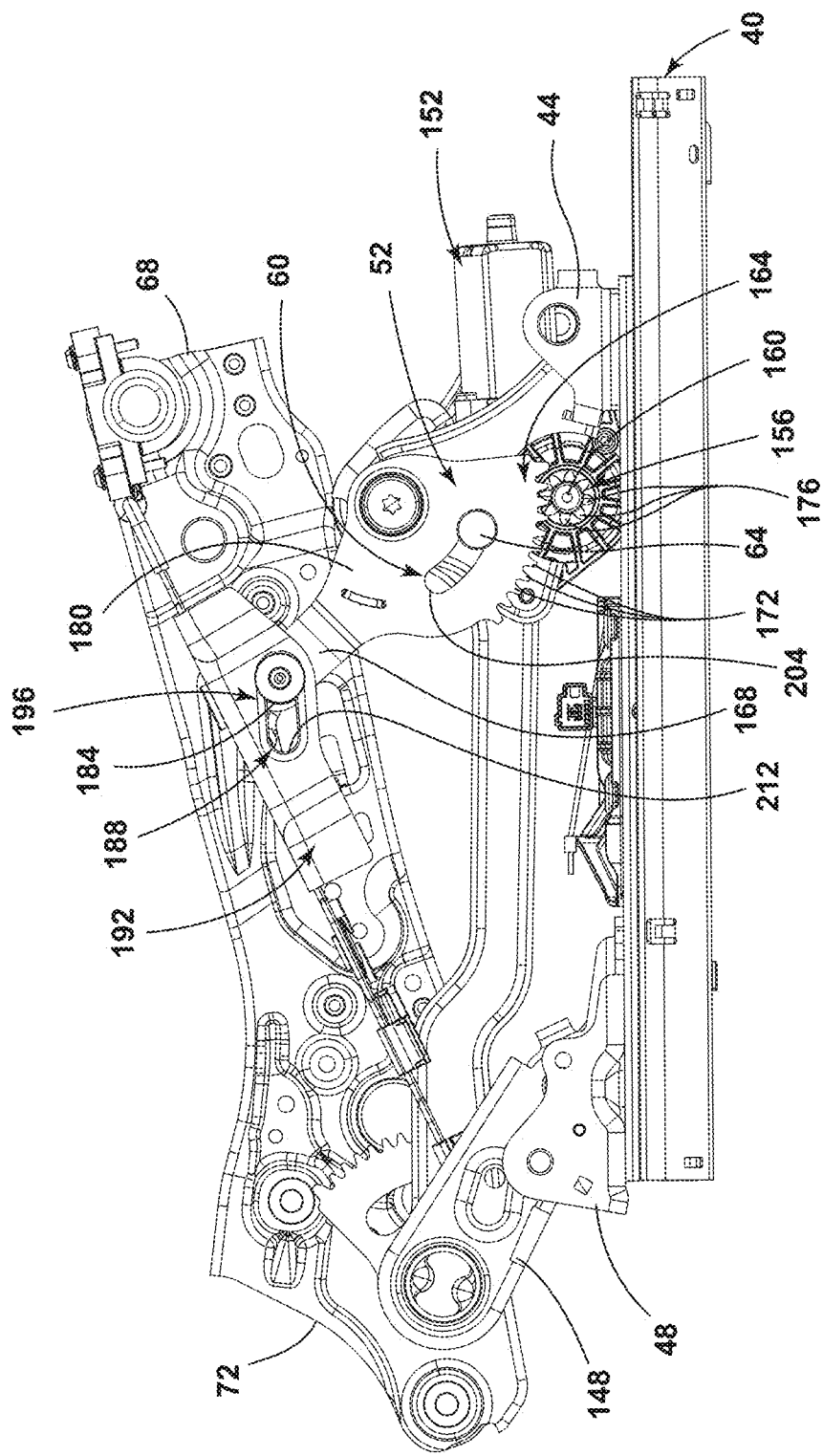
FIG. 7 is a side view of the seat, illustrating the first gear thereof in a raised position, according to one example.

Referring again to FIGS. 1 and 2, the vehicle seating assembly 24 is movable between a design position (see FIGS. 1 and 3), a lowered position (see FIG. 4), a raised position (see FIG. 5), and a reclined-and-raised position (see FIGS. 2 and 7). The reclined-and-raised position of the vehicle seating assembly 24 is intended for use when the vehicle 20 is in a stationary (i.e., non-moving) state. For example, while a transmission of the vehicle 20 is in a parked position. However, while all modern OEMs of passenger vehicles currently warn occupants against reclining the vehicle seating assembly 24 past a certain angle while the vehicle 20 is moving and/or in riding in a fully reclined or supine position due to safety concerns, it is anticipated that technology and the regulatory framework may evolve in the future where such an activity is permissible. The seatback 36 remains pivotable relative to the seat 32 independent of whether the vehicle seating assembly 24 is in the design position, the lowered position, the raised position, and/or the reclined-and-raised position. Accordingly, an angle 76 between the seatback 36 and the seat 32 may be adjustable in each of the positions that the vehicle seating assembly 24 is capable of entering. In some examples, the vehicle seating assembly 24 may be provided with a lower leg support 80. In such examples, the lower leg support 80 may be rotatably coupled to the seat 32 proximate to the front region 68 of the seat 32. Accordingly, an angle 84 between the lower leg support 80 and the seat 32 may be adjustable such that the lower leg support 80 is operable between a stowed position and a deployed position. In various examples, the lower leg support 80 may be positioned below the seat 32 when the lower leg support 80 is in the stowed position.

Figure 2:
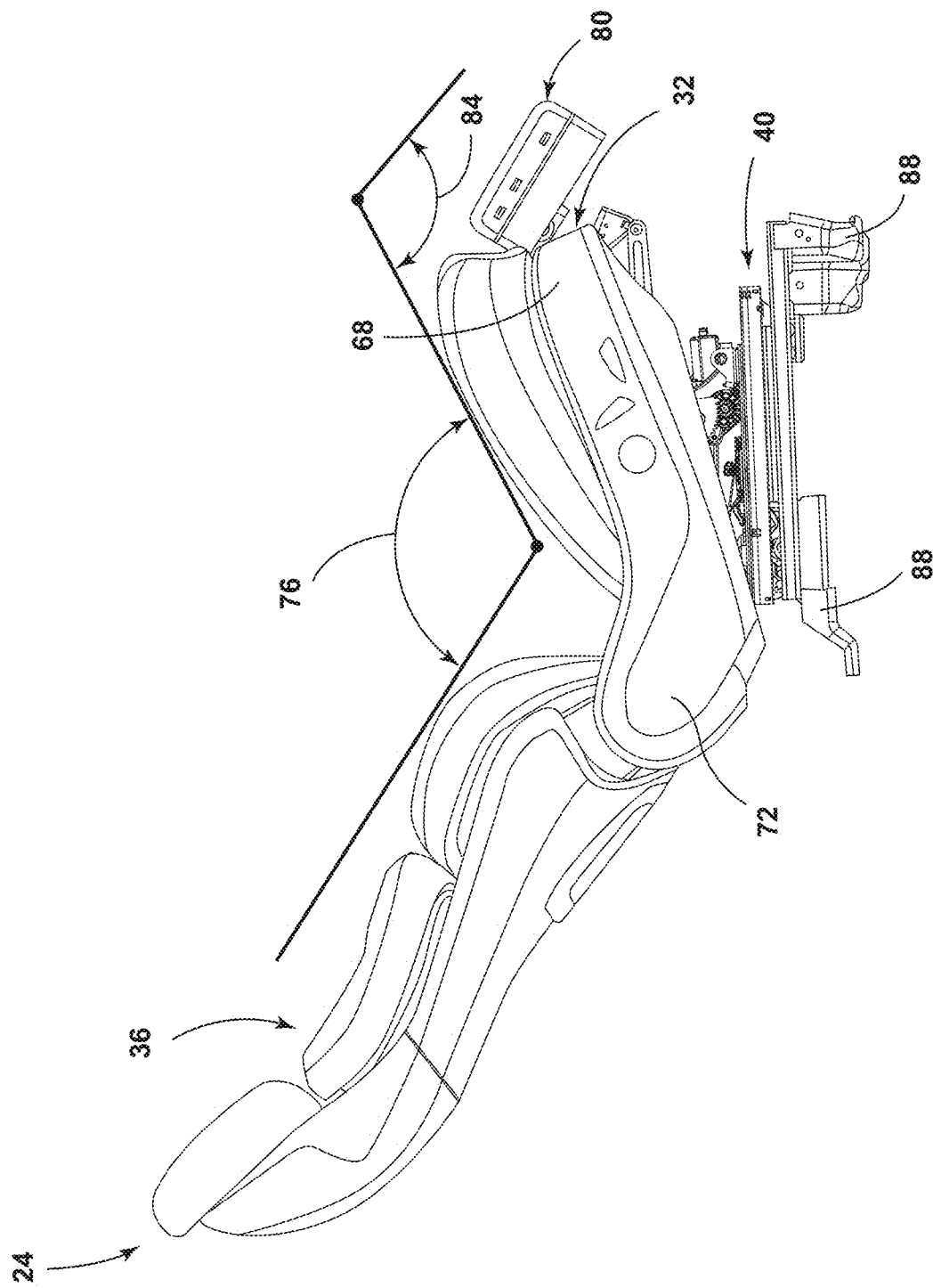
FIG. 2 is a side view of the vehicle seating assembly, illustrating a reclined-and-raised position, according to one example.

Referring further to FIGS. 1 and 2, when the vehicle seating assembly 24 is in the design position, the seat 32 may be generally parallel to the track assembly 40 and/or the floor 56 of the vehicle 20. When the vehicle seating assembly is in the reclined-and-raised position, the seat 32 may assume a non-parallel arrangement with the track assembly 40 and/or the floor 56 of the vehicle 20. For example, in the reclined-and-raised position, the seat 32 may be positioned at an acute angle relative to the track assembly 40 and/or the floor 56. The vehicle seating assembly 24 may be provided with one or more feet 88 that are configured to directly engage with the floor 56 of the vehicle 20. For example, the one or more feet 88 may engage with an underside of the track assembly 40 such that the track assembly 40 is indirectly coupled to the floor 56. The reclined-and-raised position of the vehicle seating assembly 24 is intended for use when the vehicle 20 is in a stationary (i.e., non-moving) state. For example, while a transmission of the vehicle 20 is in a parked position. However, while all modern OEMs of passenger vehicles currently warn occupants against reclining the vehicle seating assembly 24 past a certain angle while the vehicle 20 is moving and/or in riding in a fully reclined or supine position due to safety concerns, it is anticipated that technology and the regulatory framework may evolve in the future where such an activity is permissible.

Figure 3:
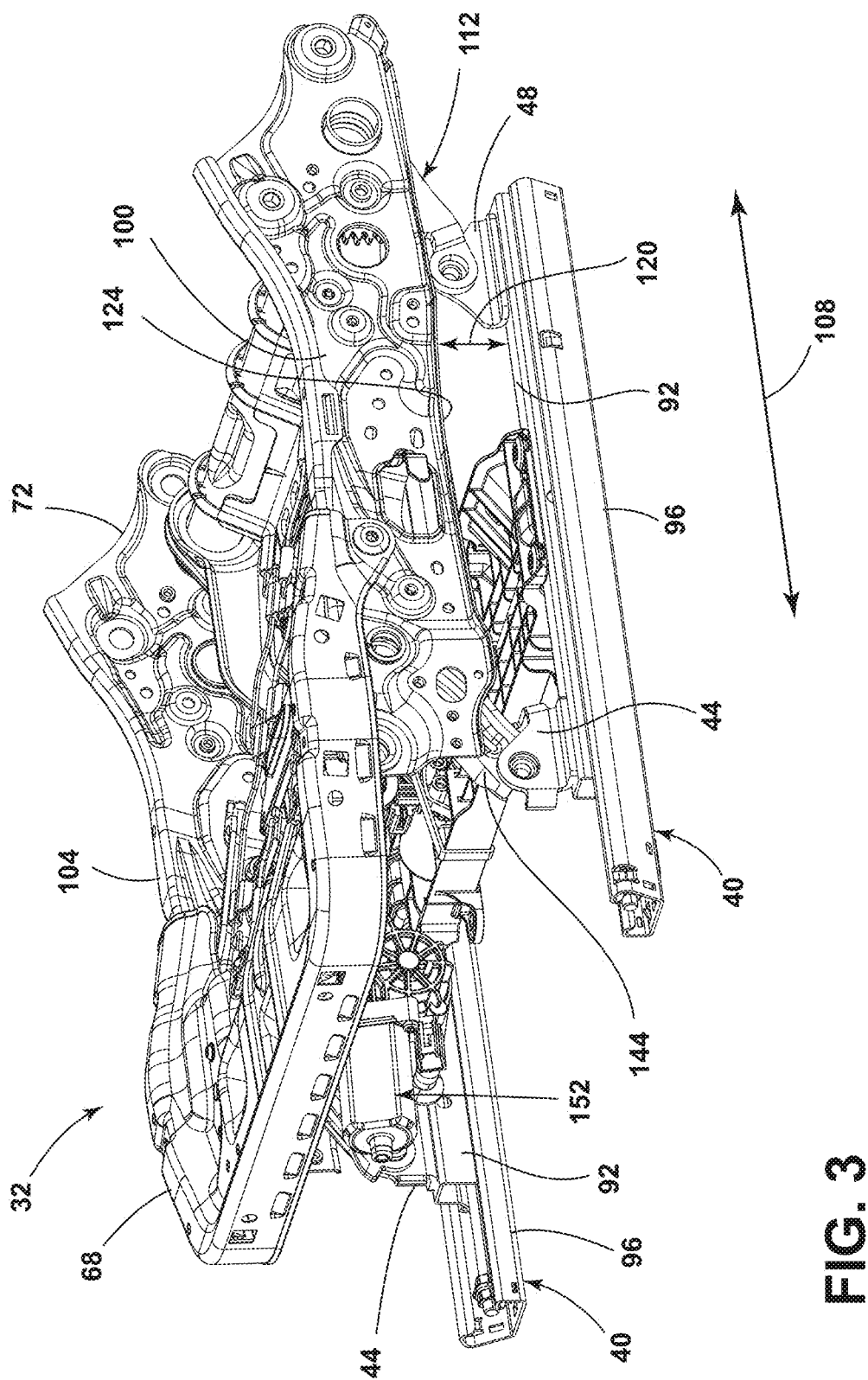
FIG. 3 is a side perspective view of a seat of the vehicle seating assembly, illustrating the seat in the design position, according to one example.
Figure 4:
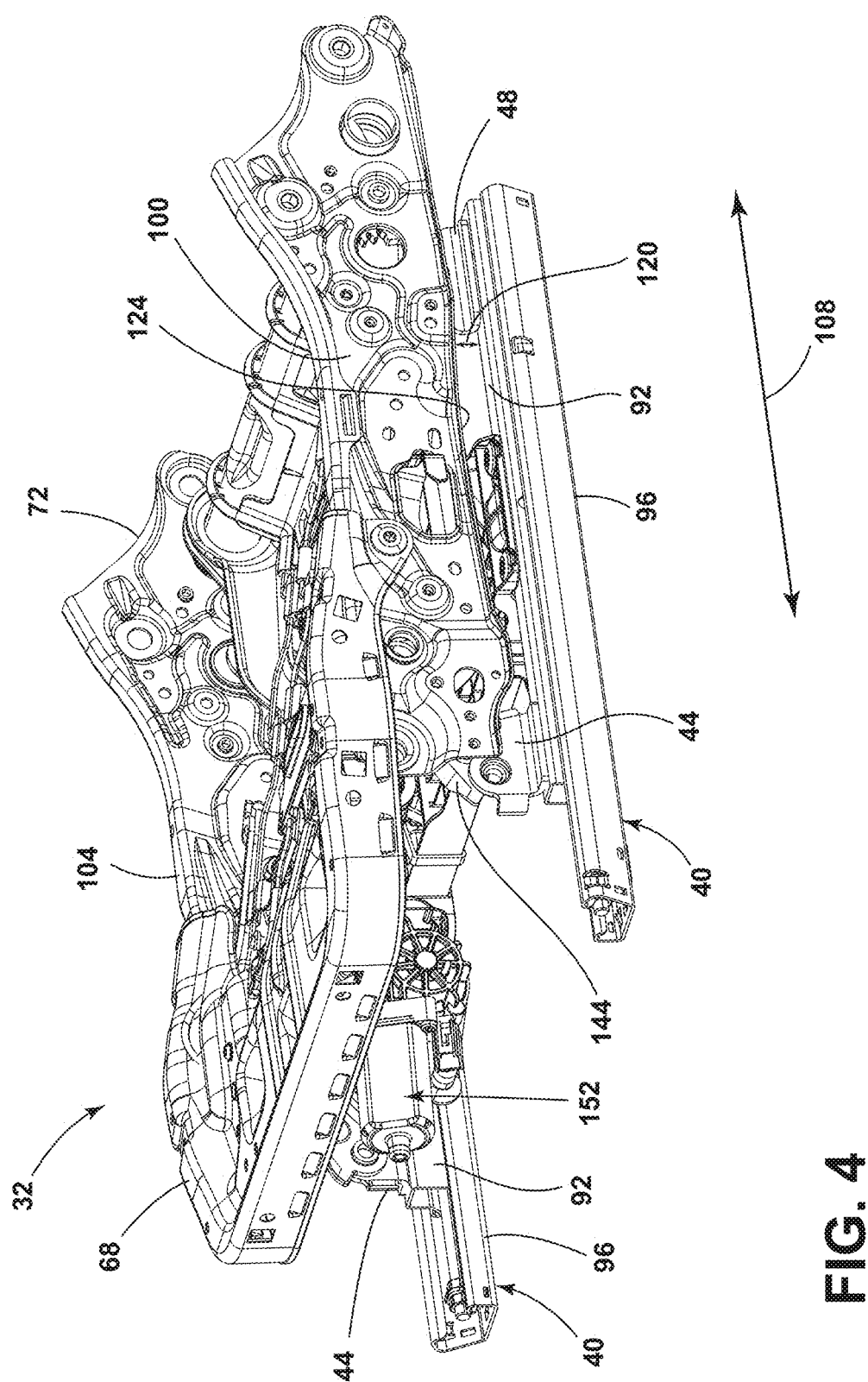
FIG. 4 is a side perspective view of the seat of the vehicle seating assembly, illustrating the seat in a lowered position, according to one example.
Figure 5:
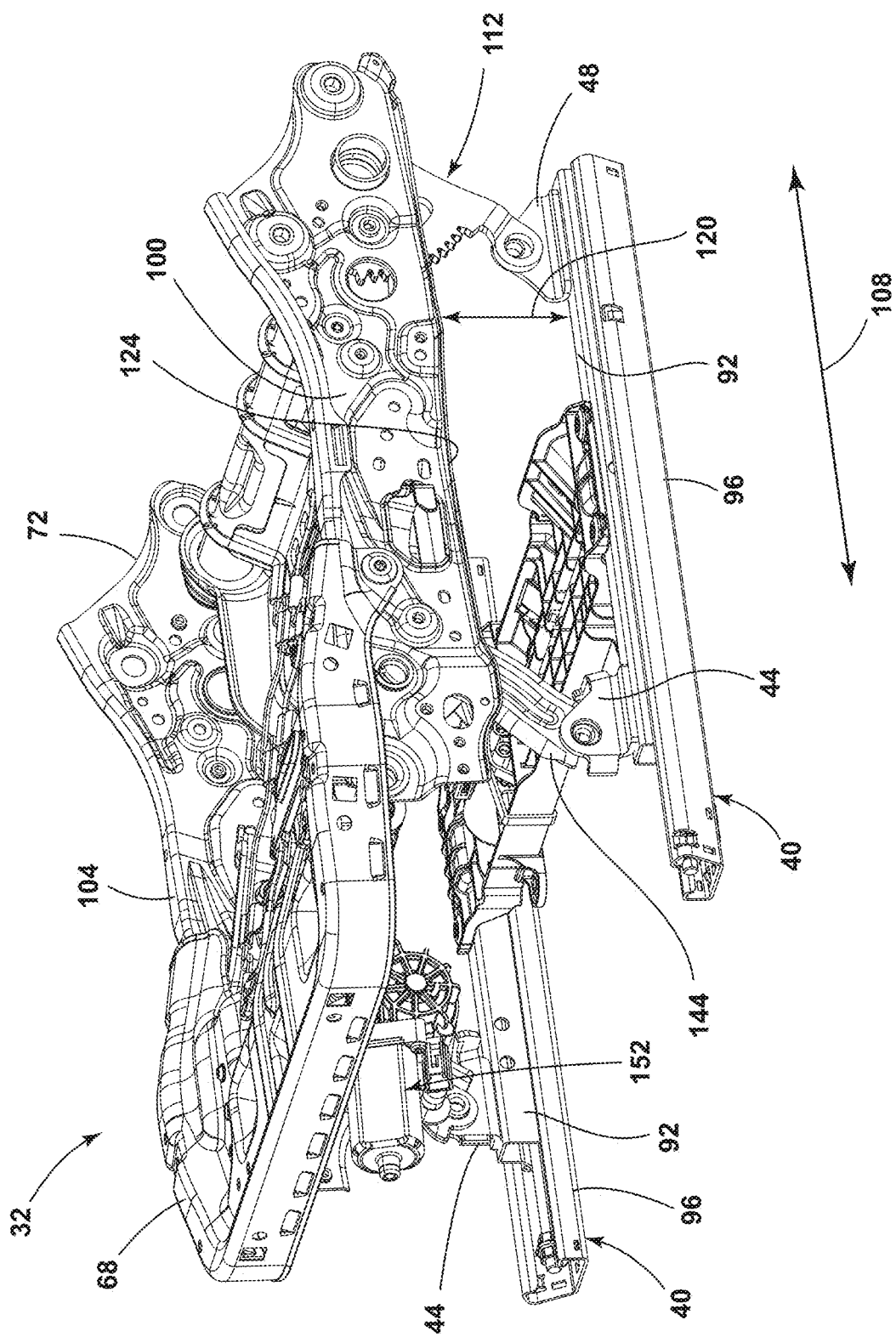
FIG. 5 is a side perspective view of the seat of the vehicle seating assembly, illustrating the seat in a raised position, according to one example.

Referring now to FIGS. 3-5, portions of the vehicle seating assembly 24 have been removed to aid in discussion of the interaction between various components of the vehicle seating assembly 24 as the vehicle seating assembly 24 is transitioned between the design position (FIG. 3), the lowered position (FIG. 4), and the raised position (FIG. 5). Each of the track assemblies 40 can include an upper track 92 and a lower track 96. In such an example, the lower track 96 may be fixedly coupled with one or more of the feet 88. The upper tracks 92 can slidably engage with their corresponding lower tracks 96. The front anchor 44 and the rear anchor 48 on a first side 100 of the seat 32 are each coupled to one of the upper tracks 92. Similarly, the front anchor 44 and the rear anchor 48 on a second side 104 of the seat 32 are each coupled to another of the upper tracks 92. Accordingly, translational motion imparted to the upper tracks 92 is transmitted to the seat 32 in the event of adjustment along a longitudinal direction 108 of the track assemblies 40.

Referring again to FIGS. 3-5, the seat 32 is provided with a second gear 112. The second gear 112 is driven by a motor 116 (see FIG. 8) to affect adjustment of a distance 120 between an underside 124 of the seat 32 and the upper track 92. Rotational motion imparted to the second gear 112 by activation of the motor 116 applies a force along the longitudinal direction 108. More specifically, rotational motion imparted to the second gear 112 by activation of the motor 116 applies a forward force 128 or a rearward force 132 to a transmission bar 136, depending upon a direction of rotation imparted to a drive gear 140 of the motor 116. The force applied to the transmission bar 136 adjusts an angular relationship between a front leg 144 and a corresponding one of the front anchors 44. Similarly, the force applied to the transmission bar 136 may adjust an angular relationship between a rear leg 148 and a corresponding one of the rear anchors 48 (see FIGS. 6 and 7).

Referring further to FIGS. 3-5, adjusting the angular relationship between the front leg 144 and the front anchor 44 while also adjusting the angular relationship between the rear leg 148 and the rear anchor 48 results in an adjustment of the height of the seat 32 relative to the track assembly 40. For example, simultaneous adjustment of the front leg 144 and the rear leg 148 in their angular relationships relative to the front anchor 44 and the rear anchor 48, respectively, can transition the vehicle seating assembly 24 between the design position, the lowered position, and the raised position. Accordingly, in various examples, the second gear 112 may control a height of the seat 32 while maintaining a pitch of the seat 32 relative to the track assemblies 40. As the height of the seat 32 is adjusted by the second gear 112 and the motor 116, the first gear 52 may travel with the seat 32 such that a distance between the track assembly 40 and the first gear 52 is also adjusted. Similarly, as the height of the seat 32 is adjusted by the second gear 112 and the motor 116, a motor 152 that is configured to drive the first gear 52 may travel with the seat such that a distance between the track assembly and the motor 152 is also adjusted. The adjustment between the first gear 52 and the track assembly 40, as well as the adjustment between the motor 152 and the track assembly 40, may occur simultaneously with the adjustment between the seat 32 and the track assembly 40.

Figure 6:
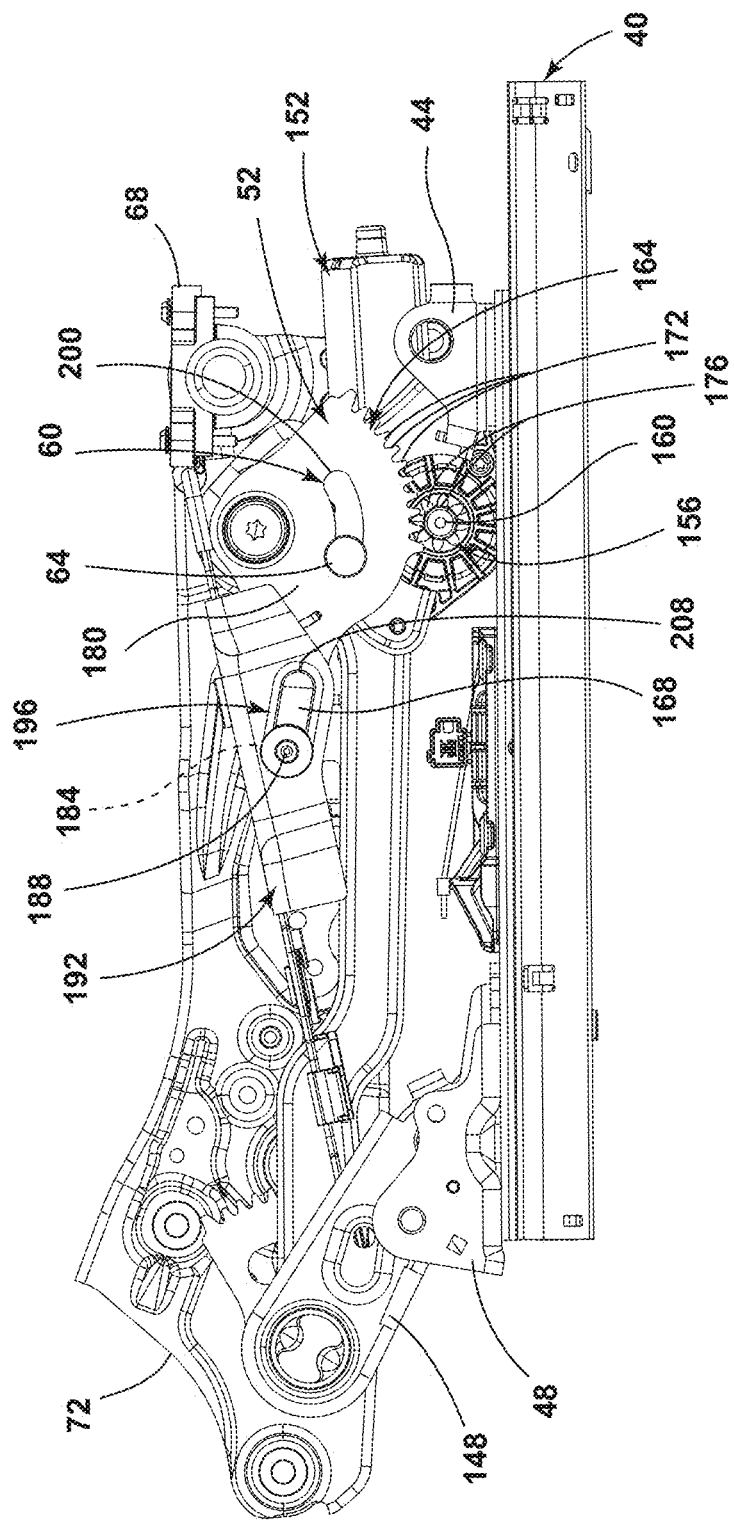
FIG. 6 is a side view of the seat, illustrating a first gear thereof in a lowered position, according to one example.

Referring to FIGS. 6 and 7, as stated above, the motor 152 is configured to drive the first gear 52. More specifically, the motor 152 is provided with a drive gear 156 that is driven by a driveshaft 160. The first gear 52 includes a sector gear 164 and a lift arm 168. The sector gear 164 defines teeth 172 in a portion of a perimeter thereof. The teeth 172 of the sector gear 164 engage with teeth 176 that are defined by the drive gear 156 of the motor 152. In various examples, the first gear 52 does not contribute to transitioning the vehicle seating assembly 24 between the design position, the lowered position, and the raised position. Said another way, the first gear 52 may be responsible for transitioning the vehicle seating assembly 24 into, and out of, the reclined-and-raised position. Accordingly, in some examples, a position of the guide pin 64 within the guide slot 60 may only be adjusted when the front region 68 of the seat 32 is adjusted relative to the rear region 72 of the seat 32. Said another way, the position of the guide pin 64 within the guide slot 60 may only change when a pitch of the seat 32 is adjusted relative to the track assembly 40. In various examples, the guide slot 60 that is defined by the first gear 52 may be arcuate in shape. For example, the shape of the guide slot 60 may generally correspond with a curvature of the portion of the first gear 52 that defines the teeth 172.

Referring again to FIGS. 6 and 7, the lift arm 168 extends from a body 180 of the first gear 52. A distal end 184 of the lift arm 168 includes a protrusion 188. Said another way, the protrusion 188 is situated away from the point at which the lift arm 168 extends from the body 180. A portion 192 of the seat 32 defines an aperture 196. The protrusion 188 of the lift arm 168 is received within the aperture 196. Activation of the motor 152 and the resulting rotation of the first gear 52 can adjust a position of the protrusion 188 within the aperture 196. Adjustment of the positioning of the protrusion 188 within the aperture 196 that is defined by the portion 192 of the seat 32 results in adjustment of the position of the front region 68 of the seat 32 relative to the rear region 72 of the seat 32. In various examples, the adjustment of the protrusion 188 of the lift arm 168 within the aperture 196 defined by the portion 192 of the seat 32 and adjustment of the first gear 52 relative to the guide pin 64 occurs in a synchronized manner. While the adjustment of the protrusion 188 relative to the aperture 196 and the adjustment of the guide pin 64 relative to the guide slot 60 may be carried out in a synchronized manner, such adjustments may not directly correlate with regard to a degree of displacement within the aperture 196 and the guide slot 60. For example, as the first gear 52 is transitioned from the positioning depicted in FIG. 6 toward the positioning depicted in FIG. 7, the relative positioning between the guide slot 60 and the guide pin 64 may begin to change prior to the relative positioning between the protrusion 188 and the aperture 196 beginning to change, as will be discussed further herein.

Referring further to FIGS. 6 and 7, the guide slot 60 includes a forward extreme 200 and a rearward extreme 204. Similarly, the aperture 196 includes a forward extreme 208 and a rearward extreme 212. In various examples, when the guide pin 64 is positioned at the rearward extreme 204 of the guide slot 60, the protrusion 188 may also be positioned at the rearward extreme 212 of the aperture 196. Similarly, when the guide pin 64 is positioned at the forward extreme 200 of the guide slot 60, the protrusion 188 may also be positioned at the forward extreme 208 of the aperture 196. Positioning the guide pin 64 at the rearward extreme 204 of the guide slot 60 and positioning the protrusion 188 at the rearward extreme 212 of the aperture 196 may represent the seat 32 being arranged in the design position. While such an arrangement may represent the design position of the seat 32, such arrangement does not necessarily imply a given angular relationship between the seatback 36 and the seat 32. Said another way, positioning the guide pin 64 at the rearward extreme 204 of the guide slot 60 and simultaneously positioning the protrusion 188 at the rearward extreme 212 of the aperture 196 may orient the pitch of the seat 32 such that the seat 32 corresponds with the design position. Similarly, since the positioning of the guide pin 64 and the protrusion 188 do not have a bearing on allowing the vehicle seating assembly 24 to transition from the design position to either the lowered position or the raised position, the arrangement of the pitch of the seat 32 by the positioning of the guide pin 64 and the positioning of the protrusion 188 does not necessarily imply a given arrangement for the distance 120 between the underside 124 of the seat 32 and the upper track 92.

Referring still further to FIGS. 6 and 7, positioning the guide pin 64 at the forward extreme 200 of the guide slot 60 and positioning the protrusion 188 at the forward extreme 208 of the aperture 196 may represent an upper limit of displacement that the first gear 52 is capable of providing. Additionally, or alternatively, positioning the guide pin 64 at the forward extreme 200 of the guide slot 60 and positioning the protrusion 188 at the forward extreme 208 of the aperture 196 may represent the reclined-and-raised position. In some examples, such positioning of the guide pin 64 relative to the guide slot 60 and positioning of the protrusion 188 relative to the aperture 196 may represent the reclined-and-raised position independent of the angle 76 between the seatback 36 and the seat 32. As stated above, the reclined-and-raised position of the vehicle seating assembly 24 is intended for use when the vehicle 20 is in a stationary (i.e., non-moving) state. For example, while a transmission of the vehicle 20 is in a parked position. However, while all modern OEMs of passenger vehicles currently warn occupants against reclining the vehicle seating assembly 24 past a certain angle while the vehicle 20 is moving and/or in riding in a fully reclined or supine position due to safety concerns, it is anticipated that technology and the regulatory framework may evolve in the future where such an activity is permissible.

Referring again to FIGS. 6 and 7, as the seat 32 is transitioned from the arrangement depicted in FIG. 6 to the arrangement depicted in FIG. 7, the motor 152 is activated to induce rotation of the drive gear 156. As the drive gear 156 is rotated, for example in a counterclockwise direction, the engagement between the teeth 176 of the drive gear 156 and the teeth 172 of the sector gear 164 results in rotation of the first gear 52 in a clockwise direction. Such rotation of the first gear 52 induces displacement of the sector gear 164, thereby causing the guide pin 64 to disengage with the rearward extreme 204 of the guide slot 60. As the first gear 52 is driven to rotate by the movement of the sector gear 164, a force is applied to the lift arm 168 and the protrusion 188 bears against the rearward extreme 212 of the aperture 196, thereby initiating a lifting of the front region 68 relative to the rear region 72. Accordingly, while the positioning of the guide pin 64 relative to the guide slot 60 may be immediately adjusted upon rotation of the first gear 52, the initial rotation of the first gear 52 does not necessarily induce an adjustment of the positioning of the protrusion 188 relative to the aperture 196.

Referring yet again to FIGS. 6 and 7, as the first gear 52 is further driven to rotate by the motor 152, the positioning of the protrusion 188 within the aperture 196 begins to adjust such that the protrusion 188 disengages from direct contact with the rearward extreme 212 of the aperture 196 and begins traversing the aperture 196 toward the forward extreme 208 of the aperture 196. While the protrusion 188 traverses the aperture 196 toward the forward extreme 208, the front region 68 is further adjusted relative to the rear region 72. In some examples, the protrusion 188 may reach the forward extreme 208 of the aperture 196 simultaneous to the guide pin 64 reaching the forward extreme 200 of the guide slot 60. Alternatively, in various examples, the protrusion 188 may reach the forward extreme 208 of the aperture 196 prior to the guide pin 64 contacting the forward extreme 200 of the guide slot 60. In such an example, the protrusion 188 may bear against the forward extreme 208 of the aperture 196 as the first gear 52 completes its rotational range of motion and ultimately ceases rotation upon contact between the forward extreme 200 of the guide slot 60 and the guide pin 64. Transitioning the seat 32 from the position shown in FIG. 7 back toward the position depicted in FIG. 6 can be accomplished by reversing the steps outlined above. In some examples, a length of the aperture 196 and a length of the guide slot 60 may be substantially equal to one another. In alternative examples, the length of the aperture 196 and the length of the guide slot 60 may not be substantially equal to one another. In such an example, the length, or an arc length, of the guide slot 60 may be greater than the length of the aperture 196.

Figure 8:
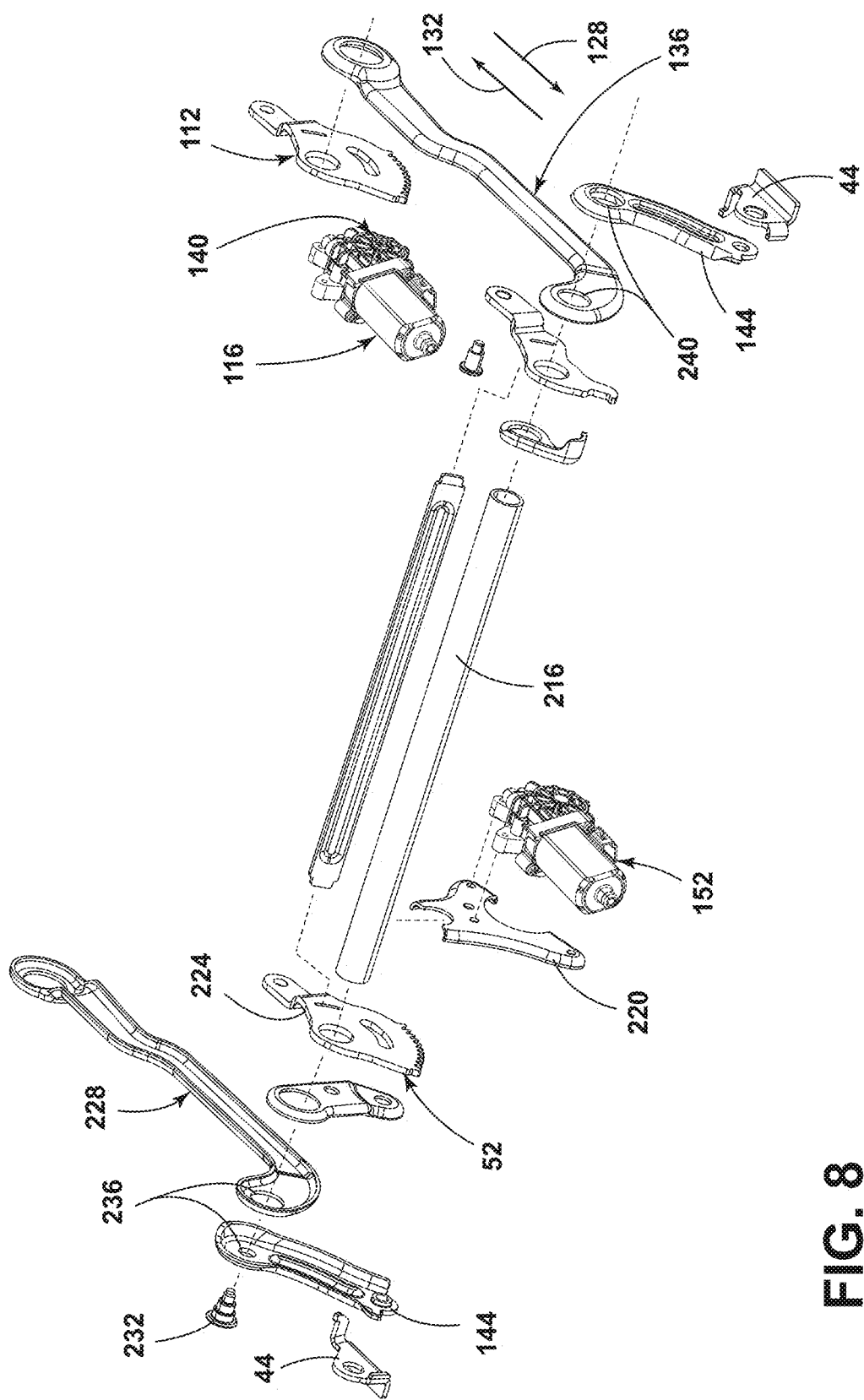
FIG. 8 is an exploded view of various components of the seat, illustrating coupling arrangements therebetween, according to one example.

Referring to FIG. 8, the motor 152 is mounted to a cross tube 216 by a motor bracket 220. The first gear 52 defines a hole 224 that receives an end of the cross tube 216. The first gear 52 may rotate about an axis defined by the cross tube 216 when the motor 152 is activated. A connector bar 228 may be positioned on an opposite side of the seat 32 from the transmission bar 136. The connector bar 228 may serve a similar purpose as the transmission bar 136. The first gear 52, one of the front legs 144, and the connector bar 228 may each be coupled to the cross tube 216 by way of a fastener 232. More specifically, fastener apertures defined by the front leg 142 and the connector bar 228 may receive the fastener 232 therein. Additionally, the hole 224 defined by the first gear 52 receives the fastener 232. The end of the cross tube 216 that is proximate to the first gear 52 ultimately receives the fastener 232 as well. An end of the cross tube 216 that is opposite to the first gear 52 is received in fastener apertures 236 that are defined by the transmission bar 136 and the other front leg 144. A fastener similar to the fastener 232 may be received within the fastener apertures 240 and the end of the cross tube 216 that is proximate to the transmission bar 136.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle seating assembly, comprising:
   a seat having a front region and a rear region;
   a seatback coupled to the seat, wherein the seatback is pivotable relative to the seat;
   a track assembly that is configured to couple the seat to a floor of a vehicle;
   a rear anchor coupled to the seat and configured to engage with the track assembly;
   a front anchor coupled to the seat and configured to engage with the track assembly, wherein a position of the seat relative to the front anchor and the rear anchor is adjustable; and
   a first gear extending between the front anchor and the seat, wherein the first gear defines a guide slot therein that receives a guide pin, and wherein movement of the first gear adjusts a position of the front region of the seat relative to the rear region of the seat;
   wherein the first gear comprises a sector gear and a lift arm, wherein a distal end of the lift arm comprises a protrusion, wherein the protrusion of the lift arm is received within an elongated aperture defined by a portion of the seat, and wherein adjustment of the protrusion of the lift arm within the elongated aperture defined by the portion of the seat is translational along a length of the elongated aperture and adjusts the position of the front region of the seat relative to the rear region of the seat.

2. The vehicle seating assembly of claim 1, wherein the vehicle seating assembly is movable between a design position, a lowered position, a raised position, and a reclined-and-raised position.

3. The vehicle seating assembly of claim 2, wherein the first gear does not contribute to transitioning the vehicle seating assembly between the design position, the lowered position, and the raised position.

4. The vehicle seating assembly of claim 1, wherein a position of the guide pin within the guide slot is only adjusted when the front region of the seat is adjusted relative to the rear region of the seat.

5. The vehicle seating assembly of claim 1, wherein the adjustment of the protrusion of the lift arm within the aperture defined by the portion of the seat and adjustment of the first gear relative to the guide pin occurs in a synchronized manner.

6. The vehicle seating assembly of claim 5, wherein positioning the guide pin at a forward extreme of the guide slot and positioning the protrusion at a forward extreme of the aperture represent an upper limit of displacement that the first gear is capable of providing.

7. The vehicle seating assembly of claim 1, wherein the guide slot defined by the first gear is arcuate in shape.

8. The vehicle seating assembly of claim 1, wherein adjustment of the first gear is accomplished by activation of a motor.

9. A vehicle seating assembly, comprising:
   a seat having a front region and a rear region;

a seatback coupled to the seat, wherein the seatback is pivotable relative to the seat;

a track assembly that is configured to couple the seat to a floor of a vehicle;

a rear anchor coupled to the seat and configured to engage with the track assembly;

a front anchor coupled to the seat and configured to engage with the track assembly, wherein a position of the seat relative to the front anchor and the rear anchor is adjustable; and a first gear extending between the front anchor and the seat, wherein the first gear defines a guide slot therein that receives a guide pin, wherein the first gear comprises a sector gear and a lift arm, wherein a distal end of the lift arm comprises a protrusion, wherein the protrusion of the lift arm is received within an elongated aperture defined by a portion of the seat, and wherein translational adjustment of the protrusion of the lift arm within the elongated aperture defined by the portion of the seat adjusts a position of the front region of the seat relative to the rear region of the seat.

10. The vehicle seating assembly of claim 9, wherein the vehicle seating assembly is movable between a design position, a lowered position, a raised position, and a reclined-and-raised position.

11. The vehicle seating assembly of claim 10, wherein the first gear does not contribute to transitioning the vehicle seating assembly between the design position, the lowered position, and the raised position.

12. The vehicle seating assembly of claim 9, wherein a position of the guide pin within the guide slot is only adjusted when the front region of the seat is adjusted relative to the rear region of the seat.

13. The vehicle seating assembly of claim 12, wherein the adjustment of the protrusion of the lift arm within the aperture defined by the portion of the seat and adjustment of the first gear relative to the guide pin occurs in a synchronized manner.

14. The vehicle seating assembly of claim 13, wherein positioning the guide pin at a forward extreme of the guide slot and positioning the protrusion at a forward extreme of the aperture represent an upper limit of displacement that the first gear is capable of providing.

15. The vehicle seating assembly of claim 9, wherein the guide slot defined by the first gear is arcuate in shape.

16. The vehicle seating assembly of claim 9, wherein adjustment of the first gear is accomplished by activation of a motor.

* * * * *